US012737745B2

(12) United States Patent
Handshaw et al.

(10) Patent No.: US 12,737,745 B2
(45) **Date of Patent: *Sep. 15, 2026**

(54) WEIGHT CHECK FOR VERIFICATION OF TICKET SWITCHING

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Yuri Astvatsaturov, Lake Forest, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 41 days.

This patent is subject to a terminal disclaimer.

(21) Appl. No.: 18/915,911

(22) Filed: Oct. 15, 2024

(65) Prior Publication Data

US 2025/0117767 A1 Apr. 10, 2025

Related U.S. Application Data

(63) Continuation of application No. 17/877,488, filed on Jul. 29, 2022, now Pat. No. 12,141,775.

(51) Int. Cl.
*G06Q 20/20* (2012.01)
*G06Q 20/40* (2012.01)

(52) U.S. Cl.
CPC ....... *G06Q 20/208* (2013.01); *G06Q 20/4016* (2013.01)

(58) Field of Classification Search
CPC .. G06Q 20/208; G06Q 20/4016; G06Q 20/20; G06Q 20/206; G06Q 20/18; G07G 1/0036; G07G 1/0045; G07G 1/0054; G07G 3/00; G07G 3/003; G07G 1/0063; G07G 1/0072
See application file for complete search history.

(56) References Cited

U.S. PATENT DOCUMENTS

| | | | | |
|---|---|---|---|---|
| 7,620,568 | B1 * | 11/2009 | Parker-Malchak | G06Q 20/20<br>340/568.1 |
| 8,448,858 | B1 * | 5/2013 | Kundu | G07G 3/003<br>235/383 |
| 11,481,751 | B1 * | 10/2022 | Chaubard | G06V 10/82 |
| 2002/0096564 | A1 * | 7/2002 | Bellis, Jr. | A47F 9/047<br>235/382 |
| 2012/0312605 | A1 * | 12/2012 | Teraoka | G01G 19/4144<br>177/25.14 |
| 2017/0221030 | A1 * | 8/2017 | Clark | G07F 7/06 |
| 2021/0192902 | A1 * | 6/2021 | Sasaki | G06Q 20/204 |

(Continued)

*Primary Examiner* — Florian M Zeender
*Assistant Examiner* — Vanessa Deligi

(57) ABSTRACT

Techniques for weight checking to verify ticket switching are disclosed. The system includes a weighing scale, cameras to capture images of items and their barcodes, a processor, and memory with instructions. The processor determines a first identification from a barcode image and a second identification from an item image. It compares these identifications to check for a match. If they do not match, it prompts the user to place the item on the scale. If the item's weight does not match the expected weight for the first identification, the system triggers mitigation actions such as pausing transactions or alerting staff.

17 Claims, 4 Drawing Sheets

(56) References Cited

U.S. PATENT DOCUMENTS

| | | | | |
|---|---|---|---|---|
| 2021/0326828 | A1* | 10/2021 | Enatsu | G06Q 20/3276 |
| 2022/0270065 | A1* | 8/2022 | Barkan | G06V 40/28 |
| 2023/0037427 | A1* | 2/2023 | Brakob | G06V 20/68 |
| 2023/0056327 | A1* | 2/2023 | Brakob | G07G 1/0081 |
| 2023/0131444 | A1* | 4/2023 | Palande | G07G 1/0009 705/23 |
| 2023/0386217 | A1* | 11/2023 | Brakob | G07G 1/0036 |

* cited by examiner

WEIGHT CHECK FOR VERIFICATION OF TICKET SWITCHING

CROSS-REFERENCE TO RELATED APPLICATIONS

The present disclosure is a continuation of U.S. patent application Ser. No. 17/877,488, filed on Jul. 29, 2022, and incorporated herein by reference in its entirety.

BACKGROUND

Many retailers use cameras in conjunction with self-checkout stations in order to prevent theft or fraud by users. For instance, cameras can be helpful in preventing "ticket switching," in which a user attaches a barcode sticker associated with a less expensive item to a more expensive item (e.g., attaching a barcode sticker for an inexpensive item to a more expensive item, placing a more expensive item into a package associated with an inexpensive item, covering a more expensive item with a less expensive item, such as a magazine, so that the barcode reader scans the less expensive item's barcode, etc.). To prevent ticket switching, images captured by the camera are analyzed to identify the item being purchased, so that the identified item can be compared to information about the item encoded in the barcode. Conventionally, if the identified item does not match the information about the item encoded in the barcode, the transaction is flagged as an instance of ticket switching.

However, it is possible to miss some instances of ticket switching when using this method. For instance, in some cases, an item can be placed in a package for another item (e.g., an expensive item may be placed in a package of an inexpensive item), such that the images captured by the camera appear to match the barcode.

Moreover, instances of false identification of ticket switching can be difficult to discern, especially since people skilled with scanning might attempt to swipe multiple items through the scan FOV at a time. When one of those items is missed in the scanning process, whether on purpose or by accident, the system may trigger an alert for ticket switching. Instances of falsely identified ticket switching can be problematic and can result in false accusations, i.e., accusing an employee or customer of stealing who is not doing so. It would be beneficial if there was a secondary means of ticket switching verification as an additional step to reduce chances of false ticket switching identification.

SUMMARY

In an embodiment, the present invention is a system for weight checking items to verify instances of ticket switching, comprising: a weighing scale; one or more cameras configured to capture images associated with a product scanning region of a scanning station, wherein the images include images of an item passing through the product scanning region and images of a barcode affixed to the item passing through the product scanning region; one or more processors; and one or more memories storing instructions that, when executed by the one or more processors, cause the one or more processors to: determine a first identification of the item based on the image of the barcode affixed to the item; determine a second identification of the item based on the image of the item; compare the first identification of the item to the second identification of the item to determine whether the first identification of the item matches the second identification of the item; based on determining that the first identification of the item does not match the second identification of the item, generate a request, to be provided audibly or visibly via a user interface, for the user to place the item on the weighing scale; determine, based on comparing a weight of the item, as measured by the weighing scale, to a first weight associated with the first identification of the item, whether the weight of the item matches the first weight; and based on determining that the weight of the item does not match the first weight, trigger one or more mitigation actions.

In a variation of this embodiment, the one or more cameras include a first camera configured to capture the images of the item to be purchased and a second camera configured to capture the images of the barcodes affixed to the item to be purchased. For example, the first camera may be a color camera.

Additionally, in a variation of this embodiment, the mitigation action includes pausing a transaction associated with the item.

Furthermore, in a variation of this embodiment, the mitigation action includes generating an alert to an employee associated with a seller of the item.

Moreover, in a variation of this embodiment, the mitigation action includes capturing, by the one or more cameras, an image or a video of an individual present at the scanning station at a time that the item is passing through the product scanning region.

Additionally, in a variation of this embodiment, the mitigation action includes preventing, by the one or more processors, future transactions of an individual present at the scanning station at a time that the item is passing through the product scanning region.

Furthermore, in a variation of this embodiment, the mitigation action includes adding, by the one or more processors, a marking to a receipt associated with the item.

Moreover, in a variation of this embodiment, the mitigation action includes charging, by the one or more processors, a purchaser of the item for both the first identification of the item and the second identification of the item.

Additionally, in a variation of this embodiment, the mitigation action includes charging, by the one or more processors, a purchaser of the item for the more expensive of the first identification of the item and the second identification of the item.

Furthermore, in a variation of this embodiment, the instructions, when executed by the one or more processors, further cause the one or more processors to add the first identification of the item to a listing of trigger items.

Moreover, in a variation of this embodiment, the instructions, when executed by the one or more processors, further cause the one or more processors to add the first identification of the item to a listing of trigger items is based on a number of instances at which mitigation actions are triggered for the same second identification of the item exceeding a threshold number of instances.

In another embodiment, the present invention is a system for weight checking items to verify instances of ticket switching, comprising: a weighing scale; one or more cameras configured to capture images associated with a product scanning region of a scanning station, wherein the images include images of a barcode affixed to an item passing through the product scanning region; one or more processors; and one or more memories storing instructions that, when executed by the one or more processors, cause the one or more processors to: determine an identification of the item based on the image of the barcode affixed to the item;

compare the identification of the item to a listing of one or more trigger items to determine whether the identification of the item matches any of the one or more trigger items; based on determining that the identification of the item matches any of the one or more trigger items, generate a request to be provided audibly or visibly via a user interface, for the user to place the item on the weighing scale; determine, based on comparing a weight of the item as measured by the weighing scale, to the identification of the item, whether the weight of the item matches a weight associated with the first identification of the item; and based on determining that the weight of the item does not match the weight associated with the identification of the item, triggering one or more mitigation actions.

Additionally, in a variation of this embodiment, the mitigation action includes pausing a transaction associated with the item.

Furthermore, in a variation of this embodiment, the mitigation action includes generating an alert to an employee associated with a seller of the item.

Moreover, in a variation of this embodiment, the mitigation action includes capturing, by the one or more cameras, an image or a video of an individual present at the scanning station at a time that the item is passing through the product scanning region.

Additionally, in a variation of this embodiment, the mitigation action includes preventing, by the one or more processors, future transactions of an individual present at the scanning station at a time that the item is passing through the product scanning region.

Furthermore, in a variation of this embodiment, the mitigation action includes adding, by the one or more processors, a marking to a receipt associated with the item.

In yet another embodiment, the present invention is a method for weight checking items to verify instances of ticket switching, comprising: determining, by one or more processors, a first identification of an item passing through a product scanning region of a scanning station based on one or more images of a barcode affixed to the item; determining, by the one or more processors, a second identification of the item based on one or more images of the item; comparing, by the one or more processors, the first identification of the item to the second identification of the item to determine whether the first identification of the item matches the second identification of the item; based on determining that the first identification of the item does not match the second identification of the item, generating, by the one or more processors, a request, to be provided audibly or visibly via a user interface, for the user to place the item on the weighing scale; determining, by the one or more processors, based on comparing a weight of the item, as measured by the weighing scale, to a first weight associated with the first identification of the item, whether the weight of the item matches the first weight; and based on determining that the weight of the item does not match the first weight, triggering, by the one or more processors, one or more mitigation actions.

In a variation of this embodiment, the one or more images of the barcode are processed for barcode decoding, and the one or more images of the item are processed without regard for barcode decoding.

In still another embodiment, the present invention is a method for weight checking items to verify instances of ticket switching, comprising: determining, by one or more processors, an identification of an item passing through a product scanning region of a scanning station based on one or more images of a barcode affixed to the item; comparing, by the one or more processors, the identification of the item to a listing of one or more trigger items to determine whether the identification of the item matches any of the one or more trigger items; based on determining that the identification of the item matches any of the one or more trigger items, generating, by the one or more processors, a request to be provided audibly or visibly via a user interface, for the user to place the item on the weighing scale; determining, by the one or more processors, based on comparing a weight of the item as measured by the weighing scale, to the identification of the item, whether the weight of the item matches a weight associated with the first identification of the item; and based on determining that the weight of the item does not match the weight associated with the identification of the item, triggering, by the one or more processors, one or more mitigation actions.

In a variation of this embodiment, the one or more images of the barcode are processed for barcode decoding, and the one or more images of the item are processed without regard for barcode decoding.

In another embodiment, the present invention is a computing device for weight checking items to verify instances of ticket switching, comprising: one or more processors; and one or more memories storing instructions that, when executed by the one or more processors, cause the one or more processors to: determine a first identification of an item passing through a product scanning region of a scanning station based on one or more images of a barcode affixed to the item; determine a second identification of the item based on one or more images of the item; compare the first identification of the item to the second identification of the item to determine whether the first identification of the item matches the second identification of the item; based on determining that the first identification of the item does not match the second identification of the item, generate a request, to be provided audibly or visibly via a user interface, for the user to place the item on the weighing scale; determine, based on comparing a weight of the item, as measured by the weighing scale, to a first weight associated with the first identification of the item, whether the weight of the item matches the first weight; and based on determining that the weight of the item does not match the first weight, trigger one or more mitigation actions.

In a variation of this embodiment, the one or more images of the barcode are processed for barcode decoding, and the one or more images of the item are processed without regard for barcode decoding.

In yet another embodiment, the present invention is a computing device for weight checking items to verify instances of ticket switching, comprising: one or more processors; and one or more memories storing instructions that, when executed by the one or more processors, cause the one or more processors to: determine an identification of an item passing through a product scanning region of a scanning station based on one or more images of a barcode affixed to the item; compare the identification of the item to a listing of one or more trigger items to determine whether the identification of the item matches any of the one or more trigger items; based on determining that the identification of the item matches any of the one or more trigger items, generate a request to be provided audibly or visibly via a user interface, for the user to place the item on the weighing scale; determine, based on comparing a weight of the item as measured by the weighing scale, to the identification of the item, whether the weight of the item matches a weight associated with the first identification of the item; and based on determining that the weight of the item does not match the weight associated with the identification of the item, triggering one or more mitigation actions.

In a variation of this embodiment, the one or more images of the barcode are processed for barcode decoding, and the one or more images of the item are processed without regard for barcode decoding.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
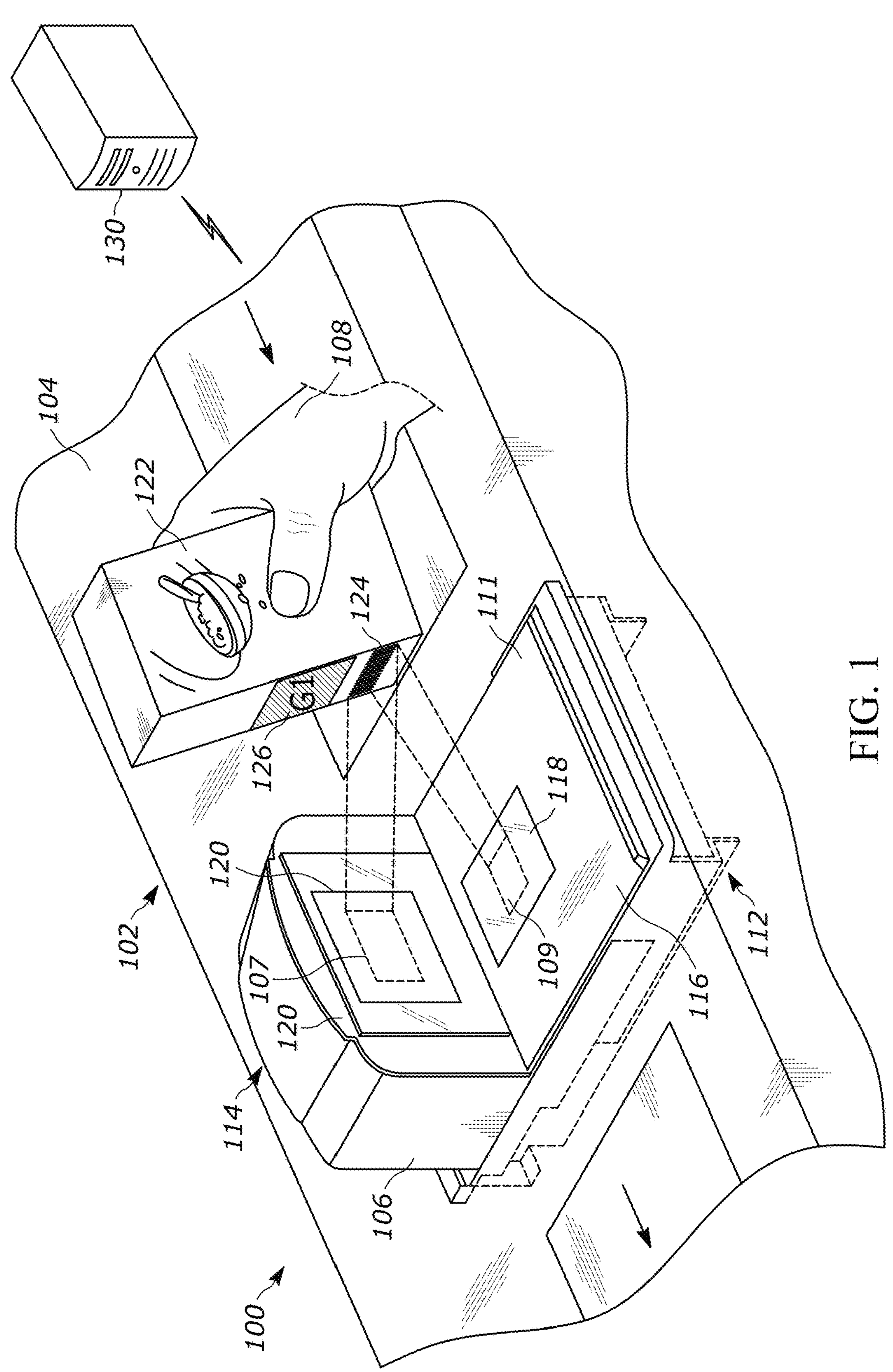
FIG. 1 is a perspective view of an example imaging system, implemented in an example point-of-sale (POS) system, having a bi-optical (also referred to as "bi-optic") imager, showing capture of an image of an object.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As discussed above, it would be beneficial if there was a secondary means of ticket switching verification as an additional step to reduce chances of false ticket switching identification. The present disclosure provides techniques for weight checking items in order to verify instances of ticket switching. Generally speaking, these techniques use the weight of an item to verify an instance of ticket switching identified by a vision camera system. If weight is correct, then the transaction can proceed. If not, then the system can implement an appropriate mitigation. Mitigations might include, but are not limited to: pausing the transaction, alerting an employee, retaining video of the event, or preventing future transactions from the individual in question. Over time, as these techniques are used, items frequently used in ticket switching (e.g., jar candles) may logged as "trigger items," and a list of trigger items may be maintained and updated as new cases are identified.

In some examples, these techniques may require a weight measurement for any items that appear in the product scanning region that were previously identified as "trigger items" (e.g., based on the log discussed above, or based on input from a user indicating additional/alternative trigger items). For example, a user may be required to weigh an item that is associated with frequent tampering before the user's transaction may proceed. These techniques may be used to identify instances of ticket switching where barcodes are peeled from one item and placed on another item, as well as instances of ticket switching in which items are placed inside an incorrect box associated with a less expensive item.

FIG. 1 illustrates a perspective view of an example imaging system capable of implementing operations of the example methods described herein, as may be represented by the flowcharts of the drawings that accompany this description. In the illustrated example, an imaging system 100 is in the form of a point-of-sale (POS) system, having a workstation 102 with a counter 104, a bi-optical (also referred to as "bi-optic") symbology reader 106, and an additional camera 107 (e.g., a video camera) at least partially positioned within a housing of the barcode reader 106. In examples herein, the symbology reader 106 is referred to as a barcode reader. Further, in examples herein, the camera 107 may be referred to as an image acquisition assembly and may be implemented as a color camera or other camera configured to obtain images of an object.

Imaging systems herein may include any number of imagers housed in any number of different devices. While FIG. 1 illustrates an example bi-optic barcode reader 106 as the imager, in other examples, the imager may be a handheld device, such as a handheld barcode reader, or a fixed imager, such as barcode reader held in place in a base and operated within what is termed a "presentation mode."

In the illustrated example, the barcode reader 106 includes a lower housing 112 and a raised housing 114. The lower housing 112 may be referred to as a first housing portion and the raised housing 114 may be referred to as a tower or a second housing portion. The lower housing 112 includes a top portion 116 with a first optically transmissive window 118 positioned therein along a generally horizontal plane relative to the overall configuration and placement of the barcode reader 106. In some examples, the top portion 116 may include a removable or a non-removable platter (e.g., a weighing platter including an electronic weighing scale).

In the illustrated example of FIG. 1, the barcode reader 106 captures images of an object, in particular an item 122, such as, e.g., a package or a produce item. In some implementations, the barcode reader 106 captures these images of the item 122 through one of the first and second optically transmissive windows 118, 120. For example, image capture may be done by positioning the item 122 within the fields of view (FOV) of the digital imaging sensor(s) housed inside the barcode reader 106. The barcode reader 106 captures images through these windows 118, 120 such that a barcode 124 associated with the item 122 is digitally read through at least one of the first and second optically transmissive windows 118, 120.

In the illustrated example of FIG. 1, additionally, the barcode reader 106 captures images of the item 122 using the camera 107, which generates image data that can be processed, e.g., using image recognition techniques, to identify the item 122 and determine whether the identified item 122 matches the barcode 124, e.g., by determining a first object identification data using image captured of the item 122 and determining a second object identification data using the barcode 124, and comparing the first and second identification data.

In the illustrated example of FIG. 1, the imaging system 100 includes a server 130 communicatively coupled to the barcode reader 106 through a wired or wireless communication link. In some examples, the server 130 is a remote server, while in other examples, the server 130 is a local server. The server 130 is communicatively coupled to a plurality of imaging systems 100 positioned at checkout area of a facility, for example. In some examples, the server 130 is implemented as an inventory management server that generates and compares object identification data. In some examples, the server 130 is accessible by a manager for monitoring operation and improper product scanning by the imaging system 100.

Figure 2:
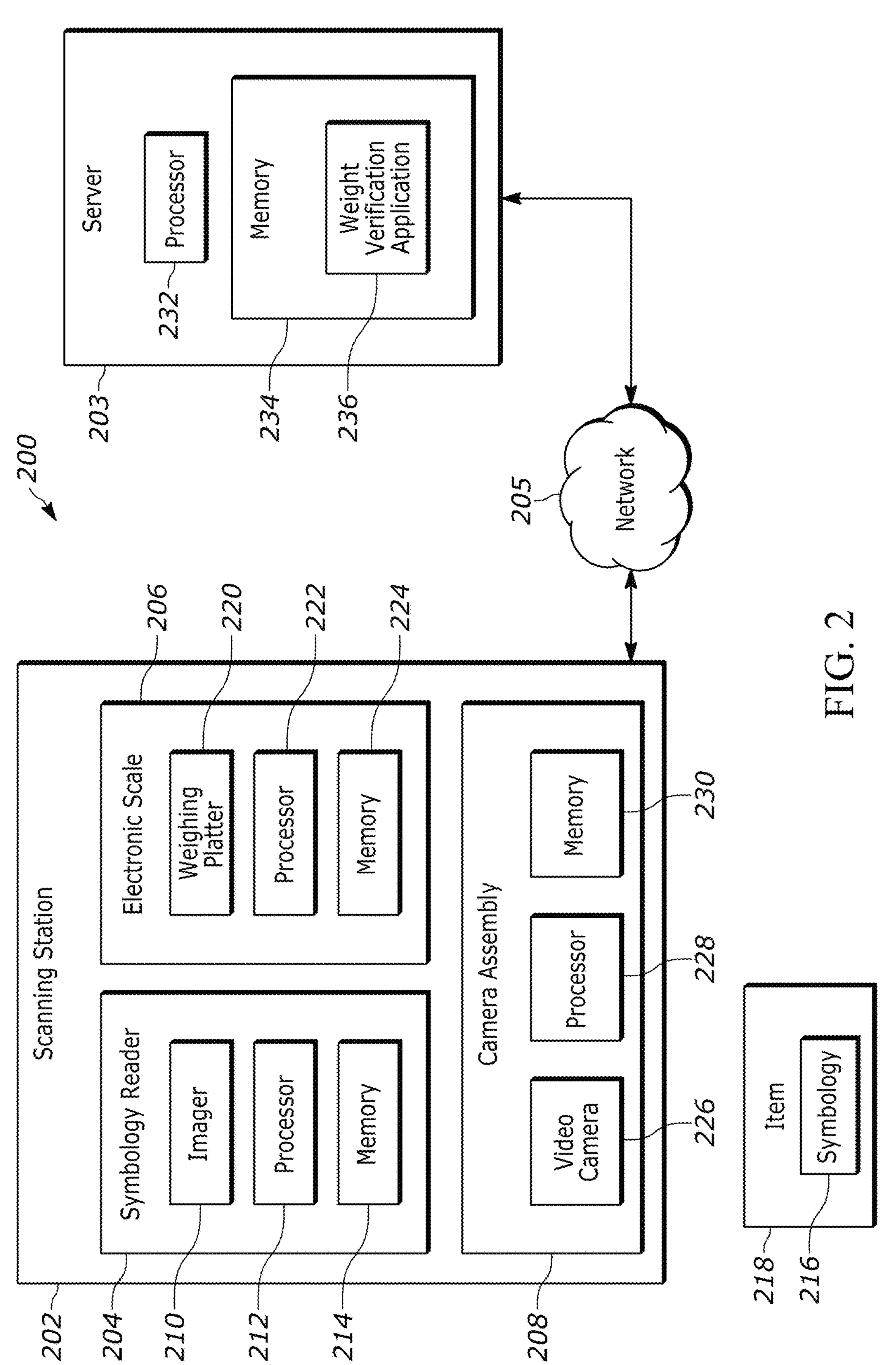
FIG. 2 illustrates a block diagram of an example logic circuit for implementing example methods and/or operations described herein including techniques for weight checking items in order to verify instances of ticket switching.

FIG. 2 illustrates an example system where embodiments of the present invention may be implemented. In the present example, the environment is provided in the form of a facility having one or more scanning locations 200 corresponding to an imaging system, such as the imaging system 100 of FIG. 1, where various items may be scanned for completing a purchase of an item.

In the illustrated example, the location 200 is a point of sale location and includes a scanning station 202 and a server 203, which may communicate via a network 205 (and/or via a wired interface, not shown). In some embodiments, the device referred to as "server 203" may be a single board computer (SBC) 203. The server 203 may be local to the scanning station 202, or may even be part of the scanning station 202 in some embodiments. In other embodiments, the server 203 may be located remotely from the scanning station 202. The scanning station 202 may include a network interface (not shown) that represents any suitable type of communication interface(s) (e.g., wired interfaces such as Ethernet or USB, and/or any suitable wireless interfaces) configured to operate in accordance with any suitable protocol(s) for communicating with the server 203 over the network 205.

The scanning station 202 may include a symbology reader 204 and an electronic scale 206, as well as a camera assembly 208. For example, the symbology reader 204, electronic scale 206, and/or the camera assembly 208 may be included within a bioptic housing. The symbology reader 204 may be a scanner, such as a barcode scanner, or any type of symbology reader, such as, e.g., an RFID tag reader. The symbology reader 204 may include an imager 210, as well as one or more processors 212, which may be, for example, one or more microprocessors, controllers, and/or any suitable type of processors, and a memory 214 accessible by the processor 212 (e.g., via a memory controller). The imager 210, which may be a camera or other suitable black-and-white or color image sensor, may be configured to capture images of a symbology 216 attached to or otherwise associated with an item 218 (e.g., an item to be purchased at the scanning station 202). The example processor 212 may interact with the memory 214 to obtain, for example, machine-readable instructions stored in the memory 214 corresponding to, for example, the operations represented by the flowcharts of this disclosure, including those of FIGS. 3 and 4. In particular, the instructions stored in the memory 214, when executed by the processor 212, may cause the processor 212 to analyze images of the symbology 216 to decode the symbology 216. Furthermore, the instructions stored in the memory 214, when executed by the processor 212, may cause the processor 212 to generate a signal (e.g., to be transmitted to the server 203) associated with a successful decoding of the symbology 216. The signal may include an indication of information associated with the decoded symbology 216. Additionally or alternatively, machine-readable instructions corresponding to the example operations described herein may be stored on one or more removable media (e.g., a compact disc, a digital versatile disc, removable flash memory, etc.) that may be coupled to the symbology reader 204 to provide access to the machine-readable instructions stored thereon.

The electronic weighing scale 206 may include a weighing platter 220, as well as one or more processors 222, which may be, for example, one or more microprocessors, controllers, and/or any suitable type of processors, and a memory 224 accessible by the processor 222 (e.g., via a memory controller). The weighting platter 220 may be configured to measure a weight associated with the item 218. The example processor 222 may interact with the memory 224 to obtain, for example, machine-readable instructions stored in the memory 224 corresponding to, for example, the operations represented by the flowcharts of this disclosure, including those of FIGS. 3 and 4. In particular, the instructions stored in the memory 224, when executed by the processor 222, may cause the processor 222 to generate a signal (e.g., to be transmitted to the server 203) associated with the weighing platter 220 measuring a stable or otherwise non-zero weight associated with the item 218. The signal may include an indication of the measured weight of the item 218. Additionally or alternatively, machine-readable instructions corresponding to the example operations described herein may be stored on one or more removable media (e.g., a compact disc, a digital versatile disc, removable flash memory, etc.) that may be coupled to the electronic scale 206 to provide access to the machine-readable instructions stored thereon.

The camera assembly 208 may include a camera 226, as well as one or more processors 228, which may be, for example, one or more microprocessors, controllers, and/or any suitable type of processors, and a memory 230 accessible by the one or more processors 228 (e.g., via a memory controller). The camera 226, which may be a video camera, may be configured to capture video images associated with the item 218. The example processor 228 may interact with the memory 230 to obtain, for example, machine-readable instructions stored in the memory 230 corresponding to, for example, the operations represented by the flowcharts of this disclosure, including those of FIGS. 3 and 4. In particular, the instructions stored in the memory 230, when executed by the processor 228, may cause the processor 228 to generate a signal (e.g., to be transmitted to the server 203). The signal may include images captured by the camera 226. Additionally or alternatively, machine-readable instructions corresponding to the example operations described herein may be stored on one or more removable media (e.g., a compact disc, a digital versatile disc, removable flash memory, etc.) that may be coupled to the camera assembly 208 to provide access to the machine-readable instructions stored thereon.

The server 203 may include one or more processors 232, which may be, for example, one or more microprocessors, controllers, and/or any suitable type of processors, and a memory 234 accessible by the one or more processors 232 (e.g., via a memory controller). An example processor 232 may interact with the memory 234 to obtain, for example, machine-readable instructions stored in the memory 234 corresponding to, for example, the operations represented by the flowcharts of this disclosure, including those of FIGS. 3 and 4. In particular, the instructions stored in the memory 234, when executed by the processor 232, may cause the processor 232 to receive and analyze signals generated by the symbology reader 204 and/or the electronic scale 206, as well as signals generated by the camera assembly 208. For example, the memory 234 may include a weight verification application 236.

Generally speaking, the weight verification application 236 may be configured to verify possible instances of ticket switching based on the weight of the item 218 that may be associated with the ticket switching. In some examples, e.g., as discussed with respect to FIG. 3, possible instances of ticket switching may be identified by analyzing the images captured by the video camera 226 in order to identify the item 218 shown in images captured by the video camera, and comparing the identified item 218 to information decoded from the symbology reader 204 to determine whether the identified item 218 matches the information encoded in the symbology 216 with which it is associated, e.g., to identify instances of ticket switching. Additionally, in some examples, e.g., as discussed with respect to FIG. 4, possible instances of ticket switching may be identified by comparing information decoded from the symbology reader 204 to determine whether the symbology 216 associated with the identified item 218 matches any items on a list of trigger items commonly associated with ticket switching. For instance, the list of items commonly associated with ticket switching may be stored in the memory 234.

In any case, once a possible instance of ticket switching is identified, the weight verification application 236 may be configured to generate a request for a user to place the item 218 on the weighing platter 220 of the electronic weighing scale 206. Moreover, in some examples, the weight verification application 236 may periodically (e.g., at set intervals, at randomized intervals, etc.) generate a request for the user to place the item 218 on the weighing platter 220 of the electronic weighing scale 206 regardless of whether a possible instance of ticket switching is identified, e.g., in order to ultimately identify new trigger items, and/or in order to determine, verify, or amend the weights of various items 218.

The request may be provided audibly or visibly via a user interface, which may be part of the scanning station 202, or may be in communication with the scanning station 202. The weight verification application 236 may compare the measured weight of the item 218 with the weight of the item identified based on the symbology 216, in order to determine whether the measured weight of the item 218 matches the weight associated with the item identified based on the symbology 216. If the weight verification application 236 determines that the measured weight of the item 218 does not match the weight associated with the item identified based on the symbology 216, one or more mitigation actions may be taken.

For instance, in some examples, the mitigation actions may include charging a purchaser of the item for costs associated with both the item 218 as identified based on the symbology 216 and the item 218 as identified based on images captured by the video camera 226, or for charging a purchaser of the item for costs associated with both the more expensive of the item 218 as identified based on the symbology 216 or the item 218 as identified based on images captured by the video camera 226.

Moreover, in some examples, the mitigation actions may include pausing a transaction associated with the item 218, and/or generating an alert to an employee associated with a seller of the item 218. Furthermore, in some examples, the mitigation actions may include adding a marking to a printed receipt associated with the item 218, i.e., indicating that the cart or the item should be checked before the purchaser leaves the retail environment with the item 218. For instance, the marking on the receipt may include a change in color, a distinct symbol or marker, a highlight, bold, or differing color for the item 218 in question, a marker symbol to direct an inspector toward the item 218 in question, etc.

Additionally, in some examples, the mitigation actions may include capturing an image or a video (e.g., using the video camera 226) of an individual present at the scanning station at a time that the item is passing through the product scanning region. For instance, the weight verification application 236, or another application, may use facial recognition techniques, or other user identification techniques, to identify the individual present at the scanning station at the time that the item is passing through the product scanning region, and the mitigation actions may further include the weight verification application 236, or another application, preventing future transactions associated with that individual from proceeding.

While the weight verification application 236 is shown as being stored on the memory 234 and executed by the processor 232, in some examples, the weight verification application 236, or an instance of the weight verification application 236, may be stored on the memory 214, 224, or 230, or another memory of the scanning station 202, and executed by the processor 212, 222, or 228, or another processor of the scanning station 202.

Moreover, in some examples, additional or alternative applications may be included in various embodiments. Moreover, in some embodiments, applications or operations described herein as being performed by the processor 232 may be performed by the processors 212, 222, or 228, and vice versa. Additionally or alternatively, machine-readable instructions corresponding to the example operations described herein may be stored on one or more removable media (e.g., a compact disc, a digital versatile disc, removable flash memory, etc.) that may be coupled to the server 203 to provide access to the machine-readable instructions stored thereon.

Figure 3:
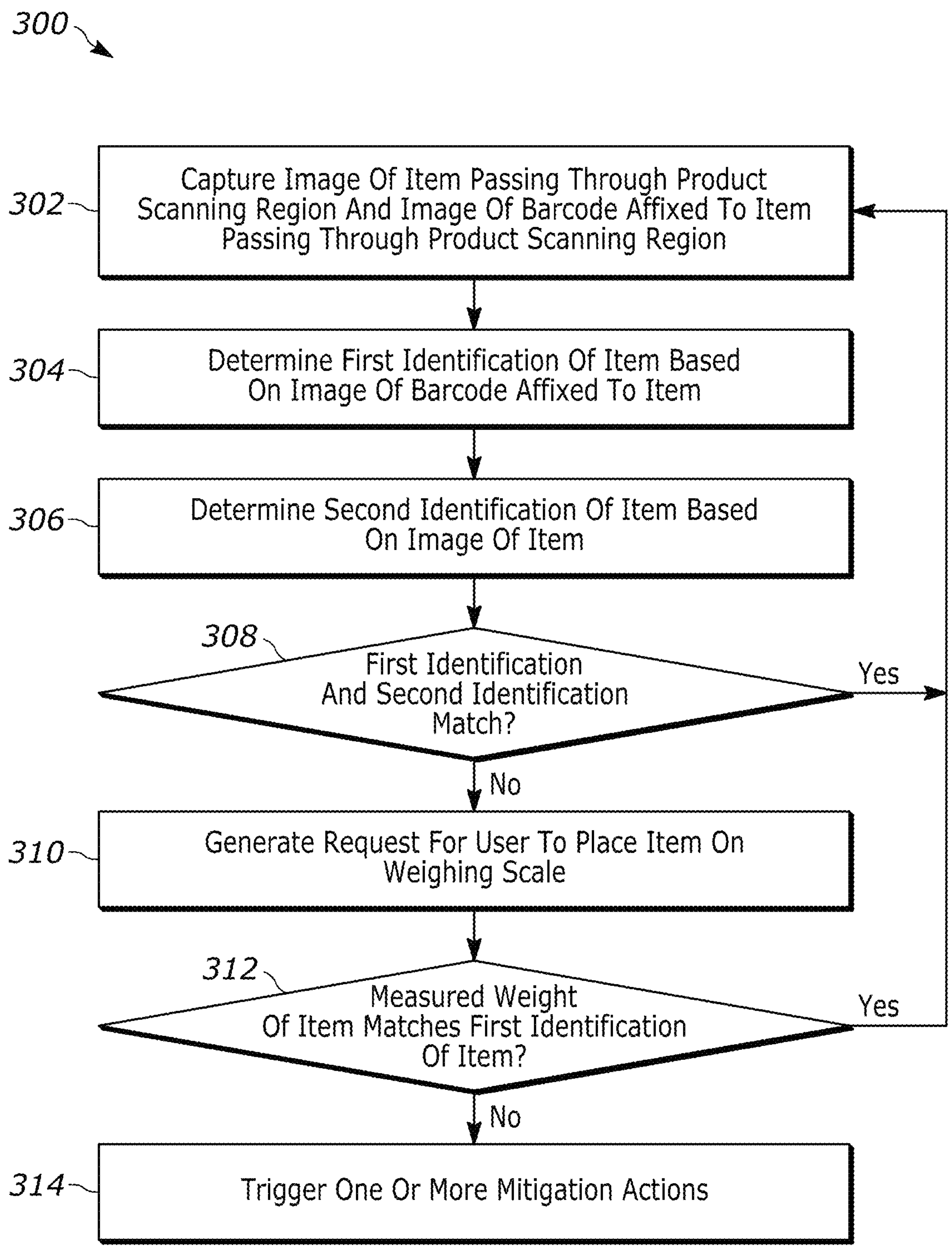
FIG. 3 illustrates a block diagram of an example process as may be implemented by the logic circuit of FIG. 2, for implementing example methods and/or operations described herein including techniques for weight checking items in order to verify instances of ticket switching.

FIG. 3 illustrates a block diagram of an example process 300 as may be implemented by the logic circuit of FIG. 2, for implementing example methods and/or operations described herein including techniques for weight checking items in order to verify instances of ticket switching, as may be performed by the imaging system 100 and server 130 in FIG. 1 or by the scanning station 202 and server 203 in FIG. 2.

At block 302, one or more cameras may capture images of items passing through a product scanning region of a scanning station, as well as images of barcodes affixed to the items passing through the product scanning region of the scanning station. In some examples, the one or more cameras may include a first camera configured to capture the images of the items to be purchased and a second camera configured to capture the images of the barcodes affixed to the items to be purchased. For instance, the first camera may be a color camera while the second camera may not be a color camera.

At block 304, a first identification of an item passing through the product scanning region may be determined based on the image of the barcode affixed to the item.

At block 306, a second identification of an item passing through the product scanning region may be determined based on the image of the item.

At block 308, a comparison may be made between first identification of the item and the second identification of the item to determine whether the first identification of the item matches the second identification of the item. If the first identification and the second identification match (block 308, YES), the transaction may proceed, and the method may proceed to block 302, where images of additional items passing through the product scanning region, and images of barcodes affixed to those items, may be captured by the one or more cameras.

If the first identification and the second identification do not match (block 308, NO), a request for the user to place the item on the weighing scale may be generated at block 310. For instance, the request may be provided audibly or visibly via a user interface, which may be part of the scanning station 202, or may be in communication with the scanning station 202.

At block 312, a weight of the item, as measured by a weighing scale, which may be part of the scanning station 202, or may be in communication with the scanning station 202, may be compared to a first weight associated with the first identification of the item. For instance, comparing the measured weight of the item to the first weight associated with the first identification of the item may include determining whether the measured weight of the item is different from the first weight by less than a threshold amount of weight. The threshold amount of weight may be a fixed amount or may be, for instance, a percentage of the first weight associated with the first identification of the item. In some examples, the threshold amount of weight may vary based on the variability of the item. For example, food products may have more variability in weight than other items such as books or electronics.

In any case, if the measured weight of the item matches the first weight associated with the first identification of the item (block 312, YES), the transaction may proceed, and the method may proceed to block 302, where images of additional items passing through the product scanning region, and images of barcodes affixed to those items, may be captured by the one or more cameras.

If the measured weight of the item does not match the first weight associated with the first identification of the item (block 312, NO), one or more mitigation actions may be triggered.

For instance, in some examples, the mitigation actions may include charging a purchaser of the item for costs associated with both the first identification of the item and the second identification of the item, or for charging a purchaser of the item for costs associated with both the more expensive of the first identification of the item and the second identification of the item.

Moreover, in some examples, the mitigation actions may include pausing a transaction associated with the item, and/or generating an alert to an employee associated with a seller of the item. Furthermore, in some examples, the mitigation actions may include adding a marking to a printed receipt associated with the item, i.e., indicating that the cart or the item should be checked before the individual leaves the retail environment with the item. For instance, the marking on the receipt may include a change in color, a distinct symbol or marker, a highlight, bold, or differing color for the item in question, a marker symbol to direct an inspector toward the questionable item, etc.

Additionally, in some examples, the mitigation actions may include capturing an image or a video of an individual present at the scanning station at a time that the item is passing through the product scanning region. For instance, facial recognition techniques, or other user identification techniques, may be used to identify the individual present at the scanning station at the time that the item is passing through the product scanning region, and the mitigation actions may further include preventing future transactions associated with that individual from proceeding.

Furthermore, in some examples, the method 300 may further include adding the first identification of the item (i.e., the barcode identification of the item) to a listing of trigger items associated with frequent ticket switching. In some examples, first identification of the item may be added to the list of trigger items based on being associated with at least a threshold number of instances of confirmed ticket switching. For instance, the threshold number of items may be set by a user, such as a store manager, associated with the retail environment in which the scanning station 202 is positioned. The listing of trigger items may be used, e.g., with respect to the process 400 shown at FIG. 4.

Figure 4:
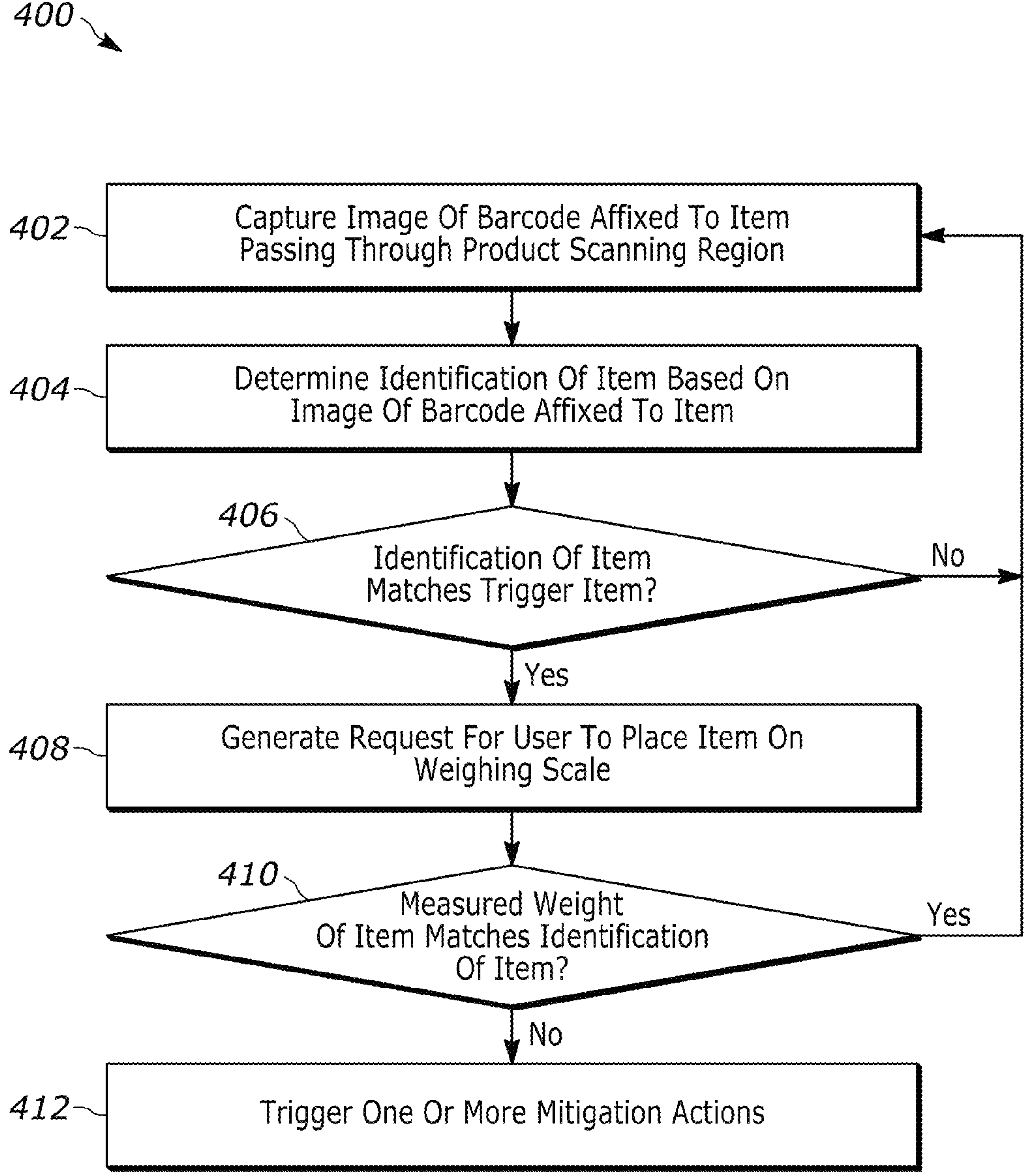
FIG. 4 illustrates a block diagram of an example process as may be implemented by the logic circuit of FIG. 2, for implementing example methods and/or operations described herein including techniques for weight checking common trigger items in order to verify instances of ticket switching.

FIG. 4 illustrates a block diagram of an example process 400 as may be implemented by the logic circuit of FIG. 2, for implementing example methods and/or operations described herein including techniques for weight checking common trigger items in order to verify instances of ticket switching, as may be performed by the imaging system 100 and server 130 in FIG. 1 or by the scanning station 202 and server 203 in FIG. 2.

At block 402, one or more cameras may capture images of barcodes affixed to items passing through the product scanning region of a scanning station, as well as images of barcodes affixed to the items passing through the product scanning region of the scanning station. In some examples, the one or more cameras may include a first camera configured to capture the images of the items to be purchased and a second camera configured to capture the images of the barcodes affixed to the items to be purchased. For instance, the first camera may be a color camera while the second camera may not be a color camera.

At block 404, an identification of an item passing through the product scanning region may be determined based on the image of the barcode affixed to the item. In some examples, block 404 may additional or alternatively include determining an identification of the item passing through the product scanning region based on an image of the item passing through the product scanning region, e.g., as captured by a color camera as discussed with respect to block 402.

At block 406, a determination may be made as to whether the identification of the item, as determined based on the image of the barcode affixed to the item, matches any "trigger items" associated with frequent ticket switching. In some examples, a user (e.g., an owner or manager of the retail environment where the scanning station is located), may provide indications of which items should be considered trigger items. Moreover, in some examples, as discussed above, items that are frequently associated with instances of confirmed ticket switching may be automatically added to a listing of trigger items.

In any case, if the identification of the item does not match any trigger items (block 406, NO), the transaction may proceed, and the method may proceed to block 402, where images of barcodes affixed to additional items passing through the product scanning region may be captured by the one or more cameras. Additionally, in some examples, if the identification of the item does not match any trigger items (406, NO), the steps of the method 300 described above with respect to FIG. 3 may be performed for the item passing through the product scanning region.

If the identification of the item matches a trigger item (block 406, YES), a request for the user to place the item on the weighing scale may be generated at block 408. For instance, the request may be provided audibly or visibly via a user interface, which may be part of the scanning station 202, or may be in communication with the scanning station 202.

At block 410, a weight of the item, as measured by a weighing scale, which may be part of the scanning station 202, or may be in communication with the scanning station 202, may be compared to a weight associated with the identification of the item. For instance, comparing the measured weight of the item to the weight associated with the identification of the item may include determining whether the measured weight of the item is different from the weight associated with the identification of the item by less than a threshold amount of weight. The threshold amount of weight may be a fixed amount or may be, for instance, a percentage of the first weight associated with the first identification of the item. In some examples, the threshold amount of weight may vary based on the variability of the item. For example, food products may have more variability in weight than other items such as books or electronics.

In any case, if the measured weight of the item matches the weight associated with the identification of the item (block 410, YES), the transaction may proceed, and the method may proceed to block 402, where images of additional items passing through the product scanning region, and images of barcodes affixed to those items, may be captured by the one or more cameras.

If the measured weight of the item does not match the weight associated with the identification of the item (block 410, NO), one or more mitigation actions may be triggered.

For instance, in some examples, the mitigation actions may include pausing a transaction associated with the item, and/or generating an alert to an employee associated with a seller of the item. Furthermore, in some examples, the mitigation actions may include adding a marking to a printed receipt associated with the item, i.e., indicating that the cart or the item should be checked before the individual leaves the retail environment with the item. For instance, the marking on the receipt may include a change in color, a distinct symbol or marker, a highlight, bold, or differing color for the item in question, a marker symbol to direct an inspector toward the questionable item, etc.

Additionally, in some examples, the mitigation actions may include capturing an image or a video of an individual present at the scanning station at a time that the item is passing through the product scanning region. For instance, facial recognition techniques, or other user identification techniques, may be used to identify the individual present at the scanning station at the time that the item is passing through the product scanning region, and the mitigation actions may further include preventing future transactions associated with that individual from proceeding.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system for weight checking items to verify instances of ticket switching, comprising:

- a weighing scale;
- one or more cameras configured to capture images associated with a product scanning region of a scanning station, wherein the images include images of a barcode affixed to an item passing through the product scanning region;
- one or more processors; and
- one or more memories storing instructions that, when executed by the one or more processors, cause the one or more processors to:
  - determine an identification of the item based on the images of the barcode affixed to the item;
  - compare the identification of the item to a listing of one or more trigger items to determine whether the identification of the item matches any of the one or more trigger items;
  - based on determining that the identification of the item matches any of the one or more trigger items, generate a request to be provided audibly or visibly via a user interface, for the user to place the item on the weighing scale;
  - determine, based on comparing a weight of the item as measured by the weighing scale, to the identification of the item, whether the weight of the item matches a weight associated with the first identification of the item; and
  - based on determining that the weight of the item does not match the weight associated with the identification of the item, triggering one or more mitigation actions.

2. The system of claim 1, wherein the mitigation action includes pausing a transaction associated with the item.

3. The system of claim 1, wherein the mitigation action includes generating an alert to an employee associated with a seller of the item.

4. The system of claim 1, wherein the mitigation action includes capturing, by the one or more cameras, an image or a video of an individual present at the scanning station at a time that the item is passing through the product scanning region.

5. The system of claim 1, wherein the mitigation action includes preventing future transactions of an individual present at the scanning station at a time that the item is passing through the product scanning region.

6. The system of claim 1, wherein the mitigation action includes adding a marking to a receipt associated with the item.

7. The system of claim 1, wherein determining whether the weight of the item matches the weight associated with the first identification of the item includes determining whether the weight of the item differs from the weight associated with the first identification of the item by less than a threshold amount of weight.

8. A method for weight checking items to verify instances of ticket switching, comprising:

- determining, by one or more processors, an identification of an item passing through a product scanning region of a scanning station based on one or more camera images of a barcode affixed to the item;
- comparing, by the one or more processors, the identification of the item to a listing of one or more trigger items to determine whether the identification of the item matches any of the one or more trigger items;

based on determining that the identification of the item matches any of the one or more trigger items, generating, by the one or more processors, a request to be provided audibly or visibly via a user interface, for the user to place the item on the weighing scale;

determining, by the one or more processors, based on comparing a weight of the item as measured by the weighing scale, to the identification of the item, whether the weight of the item matches a weight associated with the first identification of the item; and based on determining that the weight of the item does not match the weight associated with the identification of the item, triggering, by the one or more processors, one or more mitigation actions.

9. The method of claim 8, wherein the one or more mitigation actions include one or more of: pausing a transaction associated with the item, generating an alert to an employee associated with a seller of the item, or adding a marking to a receipt associated with the item.

10. The method of claim 8, wherein determining whether the weight of the item matches the weight associated with the first identification of the item includes determining whether the weight of the item differs from the weight associated with the first identification of the item by less than a threshold amount of weight.

11. A computing device for weight checking items to verify instances of ticket switching, comprising:

one or more processors; and one or more memories storing instructions that, when executed by the one or more processors, cause the one or more processors to:

determine a first identification of an item passing through a product scanning region of a scanning station based on one or more camera images of a barcode affixed to the item;

determine a second identification of the item based on one or more images of the item;

compare the first identification of the item to the second identification of the item to determine whether the first identification of the item matches the second identification of the item;

based on determining that the first identification of the item does not match the second identification of the item, generate a request, to be provided audibly or visibly via a user interface, for the user to place the item on the weighing scale;

determine, based on comparing a weight of the item, as measured by the weighing scale, to a first weight associated with the first identification of the item, whether the weight of the item matches the first weight; and based on determining that the weight of the item does not match the first weight, trigger one or more mitigation actions.

12. The computing device of claim 11, wherein the one or more images of the barcode are processed for barcode decoding, and the one or more images of the item are processed without regard for barcode decoding.

13. The computing device of claim 11, wherein the one or more mitigation actions include one or more of: pausing a transaction associated with the item, generating an alert to an employee associated with a seller of the item, or adding a marking to a receipt associated with the item.

14. The computing device of claim 11, wherein the instructions, when executed by the one or more processors, further cause the one or more processors to add the first identification of the item to a listing of trigger items.

15. The computing device of claim 11, wherein the instructions, when executed by the one or more processors, further cause the one or more processors to add the first identification of the item to a listing of trigger items.

16. The computing device of claim 11, wherein causing the one or more processors to add the second identification of the item to a listing of trigger items is based on a number of instances at which mitigation actions are triggered for the same first identification of the item exceeding a threshold number of instances.

17. The computing device of claim 11, wherein determining whether the weight of the item matches the first weight includes determining whether the weight of the item differs from the first weight by less than a threshold amount of weight.

* * * * *